US006901885B1

(12) United States Patent
Kleinsasser

(10) Patent No.: US 6,901,885 B1
(45) Date of Patent: Jun. 7, 2005

(54) APPARATUS FOR APPLYING A TATTOO TO A HOG PRIOR TO MARKET

(75) Inventor: Jonathan Kleinsasser, Ste. Agathe (CA)

(73) Assignee: Crystal Spring Colony Farms Ltd., Ste. Agathe (CA)

( * ) Notice: Subject to any disclaimer, the term of this patent is extended or adjusted under 35 U.S.C. 154(b) by 0 days.

(21) Appl. No.: 10/766,326

(22) Filed: Jan. 29, 2004

(51) Int. Cl.$^7$ ............................................. A01K 29/00
(52) U.S. Cl. .................... 119/842; 606/116; 81/9.22
(58) Field of Search .............................. 119/858, 50.7, 119/842; 606/116; 81/9.22

(56) References Cited

U.S. PATENT DOCUMENTS

| | | | | |
|---|---|---|---|---|
| 1,369,934 A | * | 3/1921 | Onstad | 101/27 |
| 1,630,303 A | * | 5/1927 | Meek | 101/30 |
| 3,633,584 A | * | 1/1972 | Farrell | 606/116 |
| 4,159,659 A | * | 7/1979 | Nightingale | 81/9.22 |
| 4,286,599 A | * | 9/1981 | Hahn et al. | 81/9.22 |
| 4,440,078 A | * | 4/1984 | McCrery et al. | 101/4 |
| 4,488,550 A | * | 12/1984 | Niemeijer | 606/116 |
| 5,009,511 A | * | 4/1991 | Sarko et al. | 366/348 |
| 5,948,123 A | * | 9/1999 | Hirata et al. | 8/404 |
| 6,263,762 B1 | * | 7/2001 | Zeitler | 81/9.22 |

* cited by examiner

Primary Examiner—Teri Pham Luu
Assistant Examiner—Bret Hayes
(74) Attorney, Agent, or Firm—Adrian D. Battison; Michael R. williams; Ryan W. Dupuis

(57) ABSTRACT

A tattoo mark is applied to a hog prior to sending the hog to market within a sorting cage with a weigh scale for detecting a weight of the hog and a sorting gate operated by a control unit in response to the detected weight. The mark is applied by a tattoo head having marking members thereon by which impact of the tattoo head on the skin of the hog applies a tattoo mark to the skin and a drive mechanism for driving movement of the tattoo head from a retracted position to an operating position for impacting the skin, the drive mechanism being mounted on a mounting assembly separate from and attached to the confining cage at the confining cage. The control unit is arranged, in response to the determination of a hog weight above the predetermined limit, to operate the drive mechanism to apply the tattoo head to the skin to apply the mark to the hog for market while operating the gate to release the hog to the market pen.

17 Claims, 4 Drawing Sheets

APPARATUS FOR APPLYING A TATTOO TO A HOG PRIOR TO MARKET

This invention relates to an apparatus for applying a tattoo mark to a hog prior to sending the hog to market.

BACKGROUND OF THE INVENTION

It is previously known in the raising and marketing of hogs that it is necessary to separate the hogs when they reach a predetermined market weight for transportation to market. For this reason a number of manufacturers have designed sorters which cause the hogs to pass through one at a time for weighing on a scale within the hog sorter which then activates a gate to select a path for the hog either to a market pen or to a retaining pen depending upon the weight of the hog.

A number of different designs of sorters of this type are readily available. Some utilize a system in which the hogs pass through on a periodic basis, generally to a feeding station. Others use other systems where the hog may be required to backup out of the containment cage or pen into which the hog enters for the weighing action.

As an entirely separate process subsequent to separation of the hogs, it is known that it is necessary to apply to the hogs for transportation to market a tattoo mark which identifies the accredited producer. The labourer involved in managing the hogs is therefore required to carry a manual tattoo marker with a series of pins arranged in the required pattern so that when the marker is applied vigorously to the skin of the hog, the pins penetrate the skin and apply the tattoo mark depending upon the pattern of the pins. In most cases it is desirable that the pins carry an ink which is then penetrated into the skin so as to more effectively mark the skin but this is not entirely necessary and a tattoo mark applied merely by the pins can also be used.

Up until now the tattoo mark has been applied by the labourer simply as a manual operation as the animals are moved from the pen to the transportation vehicle or at another time within the pen. This of course causes difficulties in that the animals must be located and each animal has to be marked. The person concerned must therefore apply considerable attention in ensuring that each animal is marked once and none are overlooked.

SUMMARY OF THE INVENTION

It is one object of the invention to provide an apparatus arranged to apply a tattoo mark to a hog prior to transportation to market.

According to one aspect of the invention there is provided an apparatus for applying a tattoo mark to a hog prior to sending the hog to market, comprising:
  a confining cage into which the hog can enter and from which the hog can leave;
  at least one confining gate assembly operable to retain the hog within the confining cage until released;
  a tattoo head having marking members thereon by which impact of the tattoo head on the skin of the hog applies a tattoo mark to the skin;
  a drive mechanism for driving movement of the tattoo head for impacting the skin, the drive mechanism being mounted on the confining cage;
  and a control unit for controlling operation of the gate assembly and the drive mechanism for releasing the hog from the confining cage when the tattoo mark has been applied.

The term "cage" used herein is not intended to imply any particular form of construction for the confining structure which may thus be formed of rails or panels or any other construction which maintains the animal within the area concerned while the mark is being applied.

Preferably the drive mechanism includes an air cylinder which is thus driven by air pressure commonly available at sorters used in hog operations.

In one preferred arrangement, the drive mechanism includes a cylinder which is mounted transversely to a wall of the confining cage and the tattoo head is mounted on a piston rod of the cylinder so as to move longitudinally of an axis of the cylinder from a position adjacent the wall to a position away from the wall for contacting the hog.

In another preferred arrangement, the tattoo head is mounted on an arm which is pivotal relative to a wall of the confining cage so as to move the tattoo head from a position adjacent the wall to a position away from the wall for contacting the hog.

Preferably the tattoo head is carried on a float spring assembly allowing movement of the tattoo head relative to the drive mechanism to accommodate different locations and/or dimensions of the hog within the confining cage.

Preferably there is provided an ink applicator for applying ink or paint or other coloring to the tattoo head, the ink applicator being arranged to engage the tattoo head by movement of the tattoo head to the retracted position.

Preferably the tattoo head and the drive mechanism are carried on a mounting assembly separate from the confining cage and arranged to be mounted on the confining cage.

Preferably the tattoo head is located at a front of the confining cage to engage the hog on the front shoulder.

According to a second aspect of the invention there is provided an apparatus for applying a tattoo mark to a hog prior to sending the hog to market, comprising:
  a confining cage into which the hog can enter and from which the hog can leave;
  a weigh scale for detecting a weight of the hog while in the confining cage;
  at least one confining and sorting gate assembly;
  a control unit for operating the gate assembly;
  the control unit being arranged to operate the gate assembly to retain the hog within the confining cage until released while the hog is weighed by the weigh scale;
  the control unit being arranged, in response to determination of a hog weight above a predetermined limit, to operate the gate assembly to sort the hog into a market pen;
  the control unit being arranged, in response to determination of a hog weight below a predetermined limit, to operate the gate assembly to sort the hog into a retaining pen;
  a tattoo head having marking members thereon by which impact of the tattoo head on the skin of the hog applies a tattoo mark to the skin;
  and a drive mechanism for driving movement of the tattoo head from a retracted position to an operating position for impacting the skin, the drive mechanism being mounted at the confining cage;
  the control unit being arranged, in response to the determination of a hog weight above the predetermined limit, to operate the drive mechanism to apply the tattoo head to the skin to apply the mark to the hog for market.

According to a third aspect of the invention there is provided an apparatus for applying a tattoo mark to a hog prior to sending the hog to market, comprising:

a tattoo head having marking members thereon by which impact of the tattoo head on the skin of the hog applies a tattoo mark to the skin;

a drive mechanism for driving movement of the tattoo head for impacting the skin;

and a mounting assembly supporting the tattoo head and the drive mechanism arranged for mounting on a confining cage for receiving the hog;

the drive mechanism being operable by a control unit for controlling operation of a gate assembly of the confining cage for releasing the hog from the confining cage when the tattoo mark has been applied.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
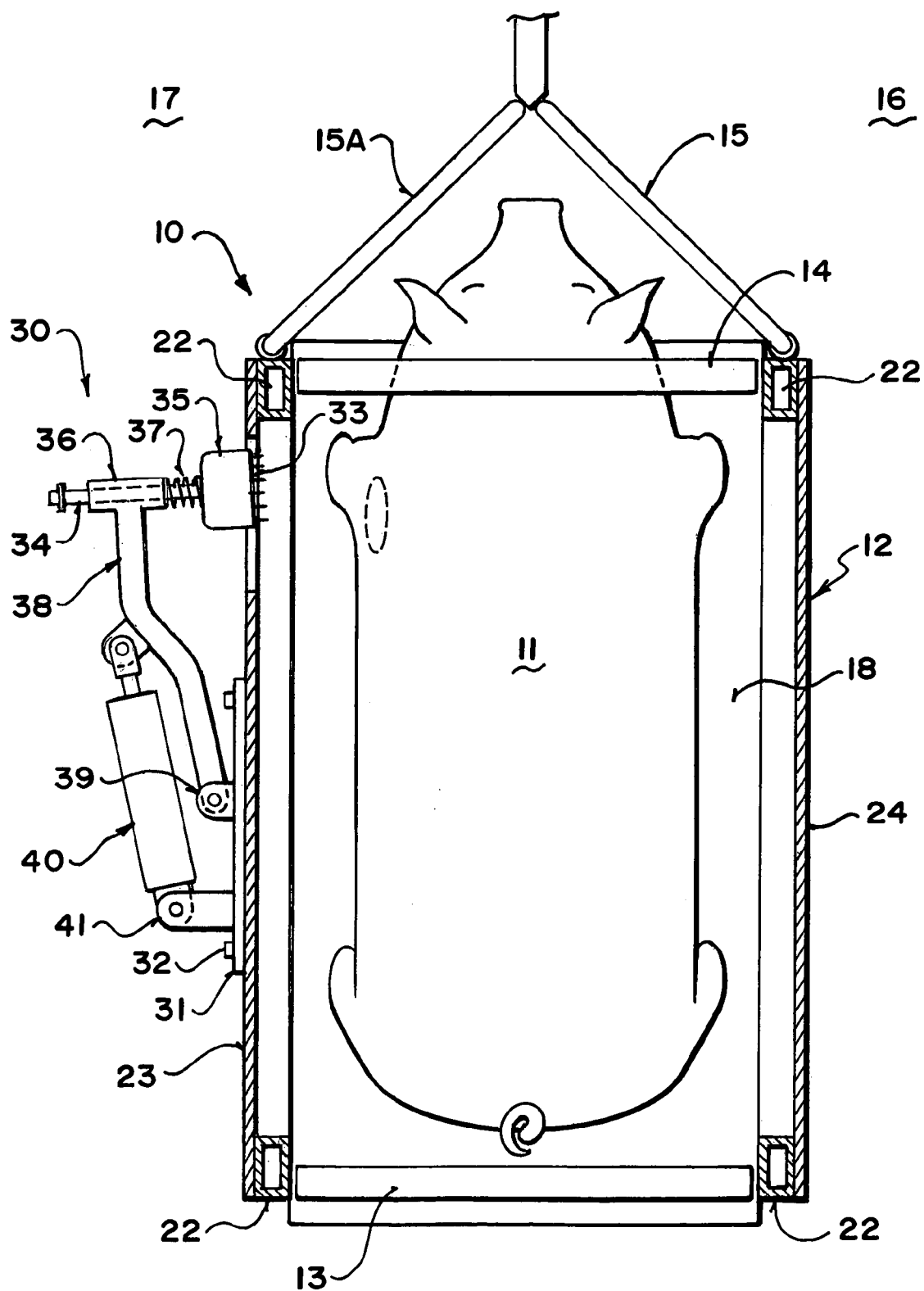
FIG. 1 is a top plan view of a hog sorter according to the present invention.
Figure 2:
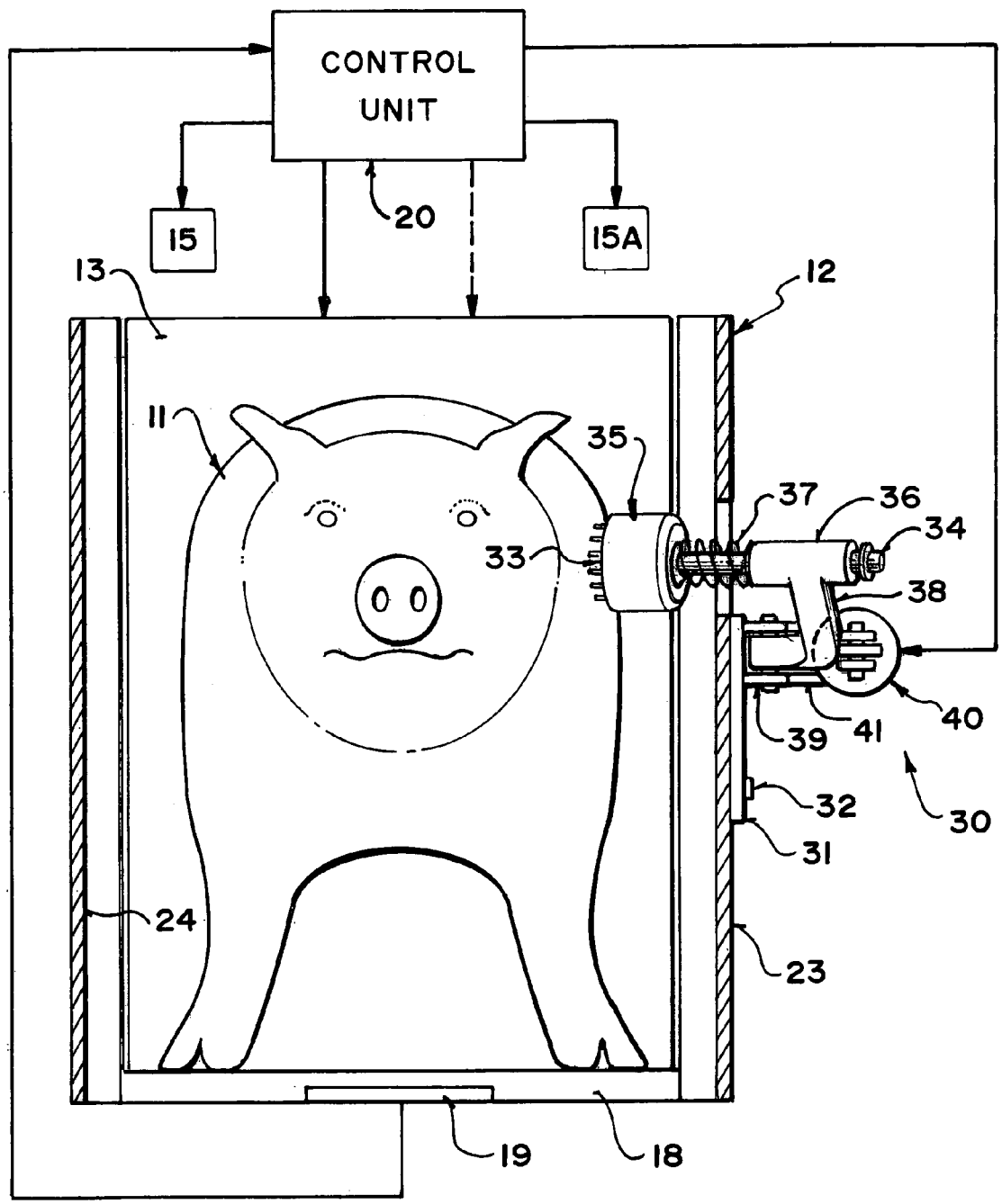
FIG. 2 is a rear elevational view of the hog sorter of FIG. 1.

In FIGS. 1 and 2 is shown a hog sorter 10 which is arranged to allow entry of a hog 11 into a confining cage 12 through a rear gate 13 to be confronted by a front gate 14 to retain the hog within the cage and a sorting gate assembly 15 and 15A at the front of the cage which can be opened to allow the hog to move either into a market pen 16 or into a retaining pen 17. In practice the retaining pen is often but not necessarily the same as the entry pen so that the animals periodically pass through the hog sorter for weighing and are passed only to the market pen when they achieve the required market weight. The confining cage 12 includes a weigh scale 18 with a load cell 19 or other measuring device which detects the weight of the hog on the scale 18 and communicates this weight electronically to a controlled unit 20 mounted on the sorter 10.

The construction of the confining cage is shown only schematically since many different designs of such cage can be provided including posts and rails or a framework and panels as is shown. Thus in the embodiment shown the confining cage is formed by four vertical posts 22 at the corners together with side panels 23 and 24 which form closed sides up to the height of the posts which in general is sufficient to retain the animal and deter the animal from attempting to climb out of the confining cage.

The control unit 20 is arranged to control the sorting gates 15 and 15A in dependence upon the weight detected as required. The control unit is arranged to control the gates 13 and 14 so that they are closed when the animal enters to prevent further animals from entering until the first animal is weighed and sorted. The length of the confining cage is sufficient to receive the animal so that it is relatively closely located within the cage with its feet on the horizontal pan forming the weigh scale 18 and its rear end up against or adjacent the rear gate 13.

A tattoo marking device is generally indicated at 30 and is used to apply a tattoo mark to the hog within the confining cage. The tattoo marker comprises a mounting assembly 31 which attaches to the side of the cage by fasteners 32. In the example shown the mounting assembly 31 is in the form of a flat plate which is screw fastened to a panel at the side of the confining cage by screw fasteners 32. However it will be appreciated that other mounting arrangements may be provided. For example the mounting assembly in the form of a mounting plate may be clamped to the side wall of a rail and post type cage structure by fastening the plate to a pair of parallel rails by U-clamps or the like. In this way the mounting plate is attached to the side of the cage in a suitable rigid manner to support the tattooing device for movement relative to the cage.

In the embodiment shown in FIGS. 1 and 2, the tattooing device comprises a tattoo head 35 which is carried on a rod 34 extending at right angles to a front tattoo face 33 of the tattoo head. The front face carries a plurality of pins arranged in a required pattern to apply the required tattoo mark to the animal as determined by a suitable authority which identifies tattoo marks with specifically authorized producers.

The rod 34 is carried for sliding movement within a sleeve 36 so that it can move forwardly and rearwardly within the sleeve but is biased forwardly by a spring 37. Thus the rod 34 can slide away from the animal when the front face 33 of the head 35 is impacted on the animal so as to absorb excessive impact forces and to apply a generally constant force to the animal regardless of the position of the animal relative to the forward movement of the sleeve and the drive mechanism. The sleeve is driven horizontally across the cage on an arm 38 on which the sleeve is fixed at the end of the arm. The arm 38 is carried on a pivot block 39 attached to the mounting plate 31. Thus the pivot block defines a vertical pivot axis for horizontal movement of the arm thus moving the head 35 across the confining cage in an arc toward the animal within the cage.

The pivotal movement of the arm 38 is effected by an air cylinder 40 which is also pivotally mounted on the plate 31 at a pivot block 41. The air cylinder 40 is mounted so that outward movement of the cylinder pushes on the arm to effect inward pivotal movement of the arm to carry the tattoo head to the animal. The cylinder on the arm are mounted outside the cage so as not to interfere with the movement of the animal within the cage and in the retracted position of the tattoo head, it is withdrawn to a position at the side wall or outside of the side wall again so as to avoid impact by the animal except if the tattoo head is to be deployed.

The arm and the mounting is arranged so that the tattoo head preferably moves horizontally across the cage so as to impact the animal at a required height on the side of the animal. This may be at the rear but is preferably at the front so as to impact on the shoulder of the animal on one side of the animal.

Figure 3:
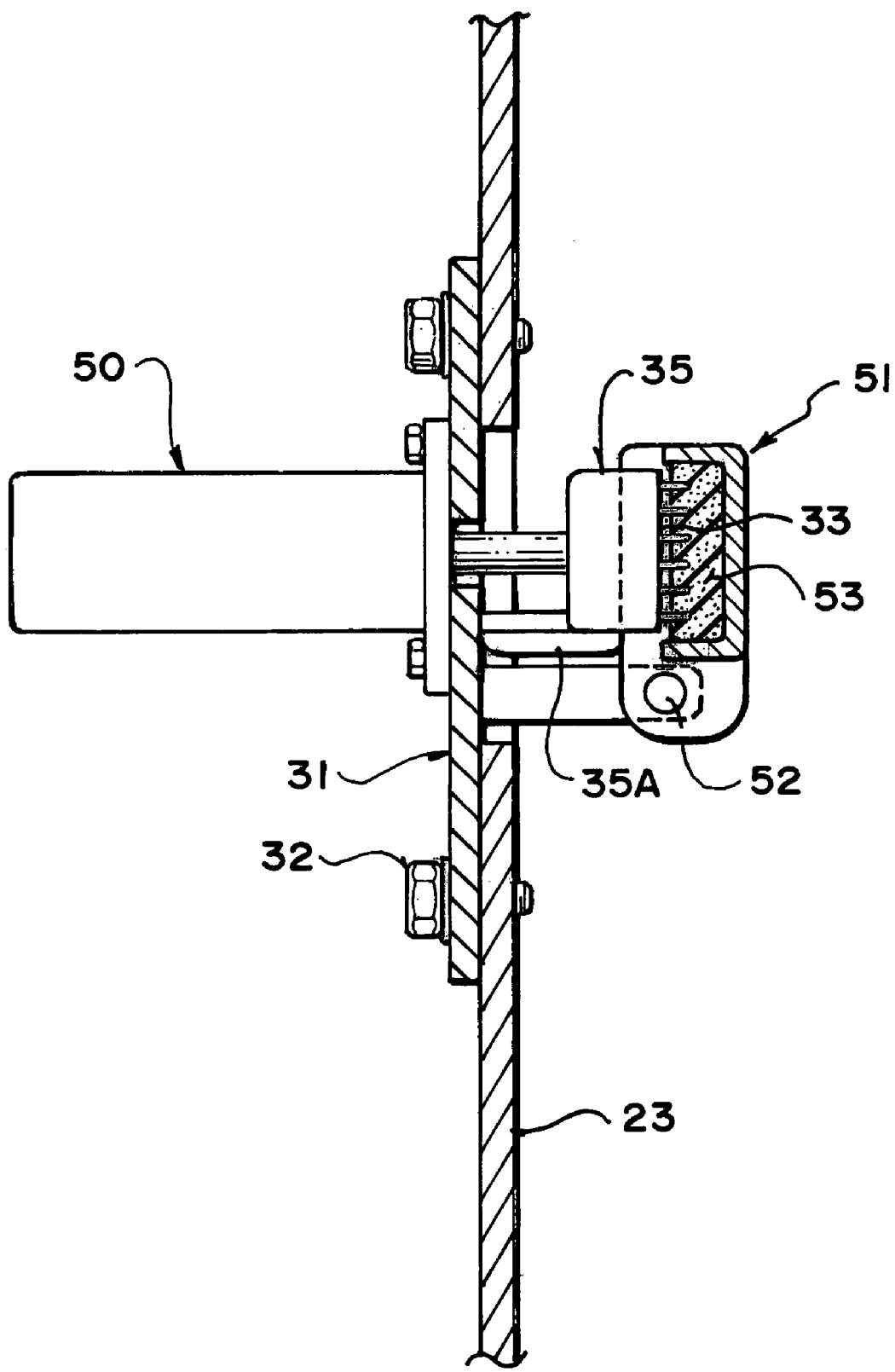
FIG. 3 is a top plan view of a modified embodiment showing only the tattoo marker itself and one part of the side wall of the confining cage.
Figure 4:
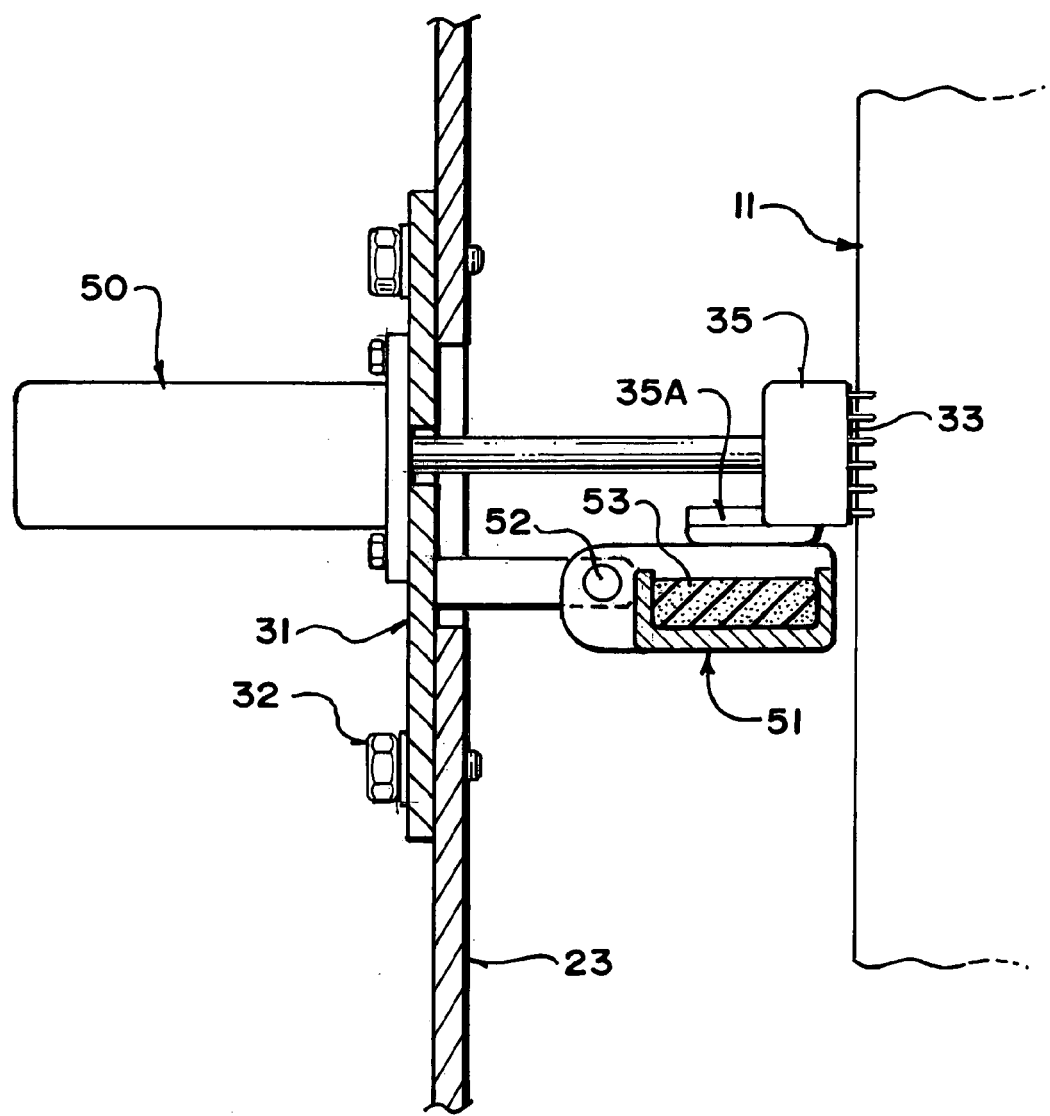
FIG. 4 is a top plan view similar to that of FIG. 3 showing the tattoo marker in operating position.

In FIGS. 3 and 4 is shown an alternative arrangement which utilizes a cylinder 50 which drives the tattoo head 35 forwardly so that the front face 33 engages the animal as indicated at 11. In this embodiment the cylinder 50 is directly mounted on the plate 31 at the side wall 24. In this embodiment there is shown an ink pad 51 mounted on a pivot 52 carried on the mounting plate 31. The ink pad is mounted so that it pivots into a position engaging the front face 33 when the head 35 is moved to a retracted position at the side wall 24. Thus each retraction movement causes the ink pad 51 to be rotated into the engagement position sitting in engagement with the front face 33 and applying ink from a sponge or similar applicator 53 to the front face 33 and the pin thereon. The ink applicator 51 is arranged to be pivoted to a position where it is removed away from the head to allow the head to move forwardly as shown in FIG. 4. A spring on the pivot mounting 52 acts to bias the ink applicator to the application position so that it is moved away from the application position to the open position by the forward movement of the head 35 and a guide 35A carried thereby.

In both embodiments the mounting arrangement is constructed so that the actuation of the tattoo head can be effected from the side wall either over the top of the side wall, through a hole cut in the side wall or between the bars of the side wall, depending upon the construction of the side wall.

Horizontal movement is to be preferred since this applies the tattoo mark at the conventional position on the shoulder or side of the animal.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. Apparatus for applying a tattoo mark to a hog prior to sending the hog to market, comprising:
   a confining cage into which the hog can enter and from which the hog can leave;
   at least one confining gate assembly movable from a first closed position in which the gate assembly acts to bar the passage of the hog to retain the hog within the confining cage to a second open position in which the gate assembly allows passage of the hog to be released from the confining cage;
   a tattoo head having marking members thereon by which impact of the tattoo head on the skin of the hog applies a tattoo mark to the skin;
   a drive mechanism for driving movement of the tattoo head for impacting the skin, the drive mechanism being mounted on the confining cage;
   and a control unit;
   the control unit being arranged to actuate the drive mechanism for applying the tattoo and the control unit being arranged to actuate movement of the gate assembly between the first closed position and the second open position for controlling operation of the gate assembly and the drive mechanism for releasing the hog from the confining cage when the tattoo mark has been applied.

2. The apparatus according to claim 1 wherein the drive mechanism includes an air cylinder.

3. The apparatus according to claim 1 wherein the drive mechanism includes a cylinder which is mounted transversely to a wall of the confining cage and the tattoo head is mounted on a piston rod of the cylinder so as to move longitudinally of an axis of the cylinder from a position adjacent the wall to a position away from the wall for contacting the hog.

4. The apparatus according to claim 1 wherein the tattoo head is mounted on an arm which is pivotal relative to a wall of the confining cage so as to move the tattoo head from a position adjacent the wall to a position away from the wall for contacting the hog.

5. The apparatus according to claim 1 wherein the tattoo head is carried on a float spring assembly allowing movement of the tattoo head relative to the drive mechanism.

6. The apparatus according to claim 1 wherein there is provided an ink applicator for applying ink to the tattoo head, the ink applicator being arranged to engage the tattoo head by movement of the tattoo head to a retracted position.

7. The apparatus according to claim 1 wherein the tattoo head and the drive mechanism are carried on a mounting assembly separate from the confining cage and arranged to be mounted on the confining cage.

8. The apparatus according to claim 1 wherein the tattoo head is located at a rear of the confining cage to engage the hog at the rear tending to encourage the hog forwardly to exit the confining cage through the gate assembly which is mounted at a front of the confining cage.

9. Apparatus for applying a tattoo mark to a hog prior to sending the hog to market, comprising:
   a confining cage into which the hog can enter and from which the hog can leave;
   a weigh scale for detecting a weight of the hog while in the confining cage;
   at least one confining and sorting gate assembly;
   a control unit for operating the gate assembly;
   the control unit being arranged to operate the gate assembly to retain the hog within the confining cage until released while the hog is weighed by the weigh scale;
   the control unit being arranged, in response to determination of a hog weight above a predetermined limit, to operate the gate assembly to sort the hog into a market pen;
   the control unit being arranged, in response to determination of a hog weight below a predetermined limit, to operate the gate assembly to sort the hog into a retaining pen;
   a tattoo head having marking members thereon by which impact of the tattoo head on the skin of the hog applies a tattoo mark to the skin;
   and a drive mechanism for driving movement of the tattoo head from a retracted position to an operating position for impacting the skin, the drive mechanism being mounted at the confining cage;
   the control unit being arranged, in response to the determination of a hog weight above the predetermined limit, to operate the drive mechanism to apply the tattoo head to the skin to apply the mark to the hog for market.

10. The apparatus according to claim 9 wherein the drive mechanism includes an air cylinder.

11. The apparatus according to claim 9 wherein the drive mechanism includes a cylinder which is mounted transversely to a wall of the confining cage and the tattoo head is mounted on a piston rod of the cylinder so as to move longitudinally of an axis of the cylinder from a position adjacent the wall to a position away from the wall for contacting the hog.

12. The apparatus according to claim 9 wherein the tattoo head is mounted on an arm which is pivotal relative to a wall of the confining cage so as to move the tattoo head from a position adjacent the wall to a position away from the wall for contacting the hog.

13. The apparatus according to claim 9 wherein the tattoo head is carried on a float spring assembly allowing movement of the tattoo head relative to the drive mechanism.

14. The apparatus according to claim 9 wherein there is provided an ink applicator for applying ink to the tattoo head, the ink applicator being arranged to engage the tattoo head by movement of the tattoo head to a retracted position.

15. The apparatus according to claim 9 wherein the tattoo head and the drive mechanism are carried on a mounting assembly separate from the confining cage and arranged to be mounted on the confining cage.

16. The apparatus according to claim 9 wherein the tattoo head is located at a rear of the confining cage to engage the hog at the rear tending to encourage the hog forwardly to exit the confining cage through the gate assembly which is mounted at a front of the confining cage.

17. The apparatus according to claim 9 wherein the confining and sorting gate assembly is movable from a first closed position in which the gate assembly acts to bar the passage of the hog to retain the hog within the confining cage to a second open position in which the gate assembly allows passage of the hog to be released from the confining cage and wherein the control unit is arranged to actuate movement of the gate assembly between the first closed position and the second open position.

* * * * *